April 17, 1973     A. DAMWYK     3,728,131
TREATMENT OF BANANAS WITH CALCIUM HYDRATED LIME
AND PRODUCT THEREOF
Filed July 27, 1970
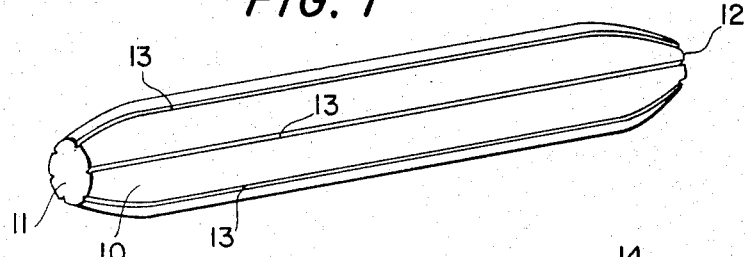
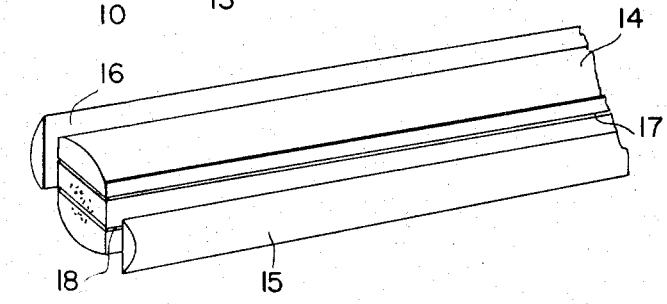
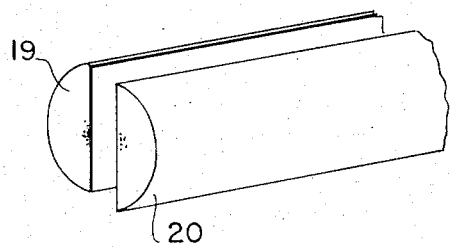
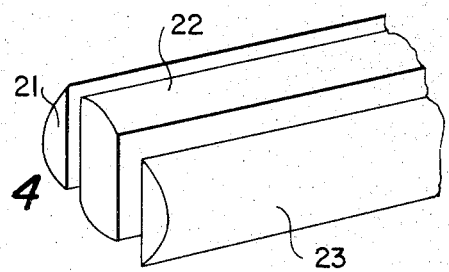
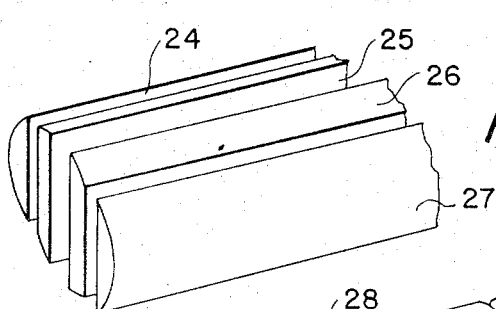
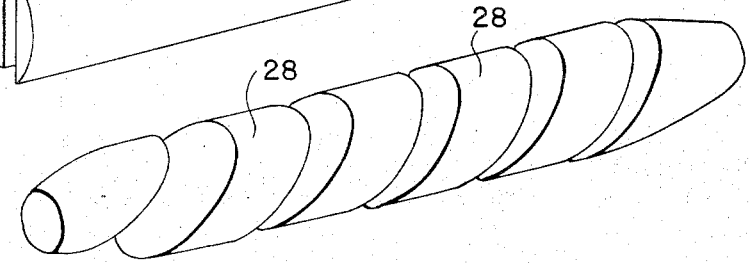
INVENTOR
ARIENS DAMWYK
BY *Millen, Rapter & White*
ATTORNEYS

United States Patent Office 3,728,131
Patented Apr. 17, 1973

3,728,131
TREATMENT OF BANANAS WITH CALCIUM HYDRATED LIME AND PRODUCT THEREOF
Ariens Damwyk, 37 Melendy Ave.,
East Watertown, Mass. 02172
Filed July 27, 1970, Ser. No. 58,304
Int. Cl. A23l *1/00*
U.S. Cl. 99—103   12 Claims

ABSTRACT OF THE DISCLOSURE

The invention relates to an edible dried banana product produced from peeled ripe bananas which are sliced and dipped in an aqueous solution of high calcium hydrated lime and thereafter dried at a temperature of about 80° to 150° F. for a period of up to about 160 hours, preferably with air circulation.

---

This invention relates to an edible, dried banana product and a process for its production.

Many processes have been used to produce banana products with varying results. Usually, the banana is dried and thereafter reconstituted with water. Such products leave much to be desired as to taste and flavor when compared to the original banana.

Various other procedures involve preservation processes such as in U.S. Pat. No. 2,343,333 wherein a ripe banana as a whole or in pulp form is treated with an acidulated solution and in a drying atmosphere. U.S. Pat. No. 3,224,886 discloses a preservation process comprising soaking the fleshy portion in an aqueous sweetening material, and drying to predetermined moisture level. The dried product may be reconstituted with water and enzymes obtained from the banana waste materials.

In Pat. No. 3,119,701, a reconstitutable dried banana product is produced by treating banana pulp with a water-soluble ether of cellulose, whipping the product into a stable foam and drying. Other patents dealing with pulping of bananas to produce a product are U.S. Pat. Nos. 2,592,332; 3,259,508 and 3,386,838.

In the banana industry at the present time, ripe bananas if not immediately consumed and/or processed, must be discarded with the resultant economic loss.

Accordingly, an object of this invention is to provide a process for producing a preserved, edible banana product from ripe bananas which does not have to be reconstituted.

Another object of this invention is to produce a preserved, edible product from ripe bananas which is tasty and candy-like and has a long shelf-life.

Other objects of the invention will be apparent to those skilled in the art from the following discussion and an embodiment thereof.

The objects of the invention are achieved by a process which comprises the steps of separating the fleshy portion of a ripe banana from its waste products, using the whole portion or slicing it lengthwise or transversely into sections, smoothing the uncut surfaces by scraping or otherwise, in some cases, grooving the surface, dipping in an aqueous solution of high calcium hydrated lime for a short period of time, and drying at temperatures of from about 80° F. to about 130° F. for a period of time up to about 120 hours sufficient to produce a relatively hardened product.

More particularly, the process involves the use of bananas which are well along in the ripening stage, and preferably, the riper the banana, the better will be the final product produced.

Reference is now made to the drawing in which:

FIG. 1 shows a whole banana with notching required to be used in the process of this invention;

FIG. 2 shows a whole banana with longitudinal portions of two sides removed and notching required;

FIG. 3 shows a banana sliced in half with no notching;

FIG. 4 shows a banana sliced in three longitudinal sections with no notching;

FIG. 5 shows a banana sliced in four longitudinal sections with no notching; and FIG. 6 shows a banana sliced in transverse sections.

The ripe banana to be used in the process is peeled and the tapered ends removed to produce a more uniform product. After peeling, the outer surface of the banana (the fleshy portion) is preferably scraped to produce a smooth surface.

Depending upon the size of the banana, it is used whole, sliced in longitudinal sections, or sliced in transverse sections. If the banana is smaller than about one inch thick, it can be used whole, sliced in half longitudinally, or sliced in transverse sections. Thus, FIG. 1 shows a whole banana 10 less than one inch in thickness with ends 11 and 12 trimmed off to produce a more uniform product.

The banana product must carefully be handled and if the thickness of a section or the whole is too thick, blisters will form on the surface during the steps of the process. To remedy the problem, the outer surface of the banana is grooved which involves a lengthwise slitting of the surface 1/4 to 3/8 inch deep. Thus, the banana 10 of FIG. 1 has six longitudinal grooves 13 across the surface of the banana.

In FIG. 2, a banana less than one inch in diameter is shown having two sides removed to produce a less thick product and as such the drying period hereinafter described is reduced in time. The banana 14 has sides 15 and 16 sliced off longitudinally and discarded. Again, grooving is required to prevent blistering. In this case, two grooves 17 and 18 are required on each side exposed by the slicing.

FIG. 3 shows a similar banana less than about one inch in diameter sliced in two longitudinal halves 19 and 20. No grooving is required since the two halves are not of a thickness which will result in blistering.

FIGS. 4 and 5 show slicing of bananas which are more than about one inch in thickness. The thickness of the longitudinal slices are not of a thickness which requires grooving to prevent blistering. FIG. 4 shows a banana sliced longitudinally into three sections 21, 22 and 23. FIG. 5 shows a banana sliced longitudinally into four sections 24, 25, 26 and 27.

FIG. 6 shows a banana of any thickness sliced transversely into a plurality of sections 28 which are of a suitable thickness not requiring grooving to prevent blistering. The transverse sections may be sliced at a right angle to the center line of the banana or at varying angles thereby producing varying section lengths of product.

Generally, the sliced banana sections should have a thickness of about one-half an inch since smaller sections are more difficult to handle in the process, and may result in broken pieces. The slicing of the banana in transverse sections as described is useful when broken bananas or parts thereof are to be used.

The banana, either whole or in sections, is then dipped into an aqueous solution of high calcium hydrated lime for about one-half minute. In about 15 minutes, the surface of the banana will harden and become light brown in color. A fragile skin, about 0.004 to 0.008 inch thick is formed and care is required to prevent damage to the skin, since it acts as an insulator to the inner portion of the banana.

The treatment solution comprises preferably about one-half tablespoon of high calcium hydrated lime powder in one gallon of water. However, the proportion of the lime may vary between one-half and nine tablespoons per gallon of water. The dipping procedure requires care in order to prevent damage to the skin that is forming and also to prevent breaking of the banana into pieces.

After the lime treatment, the banana is dried in any type of air drying system for a period of up to 160 hours at temperatures between 80° F. and 150° F. Generally, the temperature and time period required are related to the thickness of the banana sections. Thus, for sections one-half to three-quarters of an inch thick, a temperature of about 100° F. and about 120 hours drying time is suitable. For thicker sections, drying periods of up to about 160 hours are required. A preferred drying procedure involves placing the banana in a tray having a perforated bottom lined with a material to prevent the bananas from sticking to the bottom. This can be accomplished by lining the bottom with a mat of straw or the commercially available non-stick materials such as polytetrafluoroethylene coatings. Circulation of air through the tray and over the banana is desirable wherein the air tempearture is less than 150° F.

Depending upon the condition of surfaces of the sections of the banana being treated, after about 60 or 70 hours of drying time, it may be necessary to dip the banana sections into the treatment solution again. The second treatment will be required if the surface appears to be sticky which may be due to the thickness of the section, improper air circulation and drying temperature. The second treatment in the solution is usually for a period of about 5 to 7 seconds.

During the drying procedure, the bananas will form the skin and the color of the banana will become light brown. After 100 to 160 hours of drying, the banana will be a darker brown color. The surface will have formed a relatively hard pliant skin with an inner portion that is somewhat softer. The banana will have become about one-third the size of the original banana. It is not easily broken into pieces and has the consistency similar to a licorice stick.

After the drying period, the product is cooled at a temperature of about 60° to 70° F. for a period of about ten hours. The product can then be packaged.

The banana product need not be refrigerated since refrigeration would tend to crystallize the sugar content. The product is very palatable, having a candy-like sweet, banana flavored taste. The taste appears to improve with age. It is also contemplated that the dried product may be coated with chocolate and the like to give an added taste thereto.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process of producing a preserved candy-like edible banana product from ripe bananas comprising the steps of separating the edible fleshy portion of the ripe banana from the waste materials, dipping said fleshy portion in an aqueous solution of high calcium hydrated lime for a time sufficient to permit the formation of a skin of about 0.004–0.008 inch in thickness, and drying said dipped fleshy portion at a temperature of from about 80° F. to about 150° F. for a period of time sufficient to relatively harden said fleshy portion, and to obtain a dark brown surface thereof.

2. The process of claim 1 wherein said fleshy portion is sliced lengthwise to obtain sections of the fleshy portion.

3. The process of claim 1 wherein the outer surface of said fleshy portion is smoothed by scraping prior to said dipping step.

4. The process of claim 1 wherein said fleshy portion is grooved lengthwise prior to said dipping step.

5. The process of claim 1 wherein said fleshy portion is dipped in said lime solution for a period of about one-half minute.

6. The process of claim 1 wherein said drying step is for a period of up to about 160 hours.

7. The process of claim 1 wherein said drying step includes circulation of heated air at a temperature below about 150° F. over said fleshy portion being dried.

8. A preserved, dried, edible, candy-like banana product produced by the process of claim 1.

9. A process as defined in claim 1 wherein after 60–70 hours, the surface of the fleshy portion is sticky, and further comprising redipping said fleshy portion into said aqueous solution for 5–7 seconds and then continuing said drying.

10. A process as defined by claim 1 wherein said aqueous solution comprises between about ½ and 9 tablespoons of said hydrated lime per gallon of water.

11. A process as defined by claim 1 wherein said aqueous solution comprises about ½ tablespoon of said hydrated lime per gallon of water.

12. The process of claim 10 wherein said fleshy portion is dipped in said lime solution for a period of about one-half minute.

References Cited

UNITED STATES PATENTS

| | | | |
|---|---|---|---|
| 3,376,141 | 4/1968 | Delgado et al. | 99—154 |
| 2,353,333 | 7/1944 | Harris | 99—204 |
| 1,028,669 | 6/1912 | Blassneck et al. | 99—156 |
| 89,330 | 4/1869 | Norny | 99—156 |
| 2,494,258 | 1/1950 | Nickol | 99—156 X |
| 2,507,564 | 5/1950 | Foote | 99—154 |

OTHER REFERENCES

Uses and Applications of Chemicals and Related Materials, Gregory, p. 164.

S. LEON BASHORE, Primary Examiner

A. L. CORBIN, Assistant Examiner

U.S. Cl. X.R.

99—154, 204